United States Patent [19]

Hashimoto et al.

[11] Patent Number: 4,856,800
[45] Date of Patent: Aug. 15, 1989

[54] PIPE JOINING CONSTRUCTION OF A BICYCLE FRAME

[75] Inventors: Masaki Hashimoto, Osaka; Noboru Yamaguchi, Settsu, both of Japan

[73] Assignee: Araya Industrial Co., Ltd., Osaka, Japan

[21] Appl. No.: 186,146

[22] Filed: Apr. 26, 1988

[30] Foreign Application Priority Data

Nov. 11, 1987 [JP] Japan ............... 62-171428[U]

[51] Int. Cl.⁴ ............................................. B62K 19/28
[52] U.S. Cl. ............................. 280/281.1; 403/267; 403/269
[58] Field of Search ................ 280/281 R, 281.1; 403/269, 267

[56] References Cited

U.S. PATENT DOCUMENTS 4,145,068  3/1979  Toyomasu et al. ............... 403/269
4,541,649  9/1985  Grüfeld ........................... 280/281 R
4,705,286  11/1987  Lauzier et al. ................ 280/281 R

FOREIGN PATENT DOCUMENTS 54-176955  2/1979  Japan .

Primary Examiner—John A. Pekar
Attorney, Agent, or Firm—Stevens, Davis, Miller & Mosher

[57] ABSTRACT

A bicycle frame of the present invention is formed as follows.

First, the worker puts and bonds a pipe made by fibre reinforced plastics around a cylindrical projecting part of a lug made by thin wall thickness light alloy.

Next, the worker covers a joining part of the said projecting part of a lug and pipe made by fibrer reinforced plastics by sheet molding compound, (hereinafter it is called "SMC").

Last, the joining part of the projecting part of a lug and the pipe covered by said SMC is put in a molds for compression molding.

As the SMC consists of required quantity of plastics and chopped fibre same as filament comprised in the pipe made by fibre reinforced plastics, bonding of the pipe made by fibre reinforced plastics and said SMC is very good. Consequently, the joining strength of the pipe and lug is very strong in the present invention.

2 Claims, 4 Drawing Sheets

PIPE JOINING CONSTRUCTION OF A BICYCLE FRAME

BACKGROUND OF THE INVENTION

In the past, a bicycle frame joint was constructed of iron pipe joined by welding or brazing. More recently, for lightening the weight of a bicycle frame, the pipes have been made by fiber reinforced plastics.

However, the pipes made by fiber reinforced plastics cannot be joined by welding or brazing, so thermosetting adhesive agent has been spread around the cylindrical projecting part of a lug, and the pipe heat fitted outside or inside of said cylindrical projecting part as shown in FIG. 6 and FIG. 7, at a temperature of from 120° to 150° C.

A clearance of 0.05 to 0.15 mm must be maintained between the projecting part of the lug and pipe so that the joint can be made.

Since the thermal expansions of the projecting part of the lug made by light alloy and the pipe made by fiber reinforced plastics are different, unbalanced stress remains in the joint when the joint returns to ambient temperature.

Consequently, the joint is distorted by stress from every direction, and as a result thereof, the adhesive agent spread between said pipe and projecting part of said lug is torn apart.

The user, thus cannot rely on the strength of the bicycle frame.

In Japanese Utility Model application laid open gazette No. 1979-176,955 and Japanese Patent laid open gazette based on PCT application No. 1983-501,904 it is suggested to cover the joint of the pipes of a bicycle frame with plastics.

The joint does not comprise a projecting part of a lug, and is covered and fixed only by plastics, so the strength of the frame is insufficient unless the plastics layer covering the joint is very thick.

If the plastic layer is thin, the tensile stress and elasticity of the plastics cannot mounting a tight joint during operation of a bicycle.

On the other hand, if the plastics layer would be very thick, the bicycle frame is not light-weight.

SUMMARY OF THE INVENTION

The present invention relates to a light tight joint xconstruction of a cylindrical projecting part of a lug made from light alloy and pipe made by fiber reinforced plastics.

The bicycle frame of the present invention is formed of fiber reinforced plastic pipe joined to cylindrical projecting parts of a lug made of thin wall light alloy.

To construct the frame adhesive agent is spread around the cylindrical projecting part of the lug, and the pipe made by fiber reinforced plastics is placed around the cylindrical projecting part, the joint is covered with a molding compound in sheet form (SMC) and compression molded to form a covering body around the joint.

Thus, the lug and pipe form a strong joint.

The chopped fibers of the sheet molding compound (SMC) are composed of the same material as the fibers of the pipe which is made from fiber reinforced plastic. The chopped fibers are 10-100 mm in length.

The present invention has the following advantages.

Namely, a lug and pipe made from fiber reinforced plastic strongly combine as the joint of the lug and pipe covered by SMC is compression molded. Because the fibers from the fiber reinforced plastic pipe and the chopped fibers of the sheet molding compound are the same, they are bonded into one body, and a person cannot find a joining border. Consequently, the surface of the covering body formed is very smooth and grinding of said surface is not needed.

Also, the strength of the joint of the projecting part of the lug and pipes is uniform.

As the fibers comprised in SMC are same as the fibers comprised in pipes made by fiber reinforced plastic, problem caused by differences in thermal expansions of different materials does not arise.

BRIEF DESCRIPTION OF THE DRAWINGS

Other details and features of the invention will stand out from the description given below by way of non-limitative example and with reference to the accompanying drawings, in which:

FIG. 1 is a sectional view before compression molding.

FIG. 2 is a sectional view during compression molding.

FIG. 3 is a sectional view of line II—II in FIG. 2.

DESCRIPTION OF THE PREFERRED EMBODIMENT

Hereinafter, a first embodiment of the present invention used to a head lug shown in FIGS. 1 to 3 will be mentioned.

Figure 1:
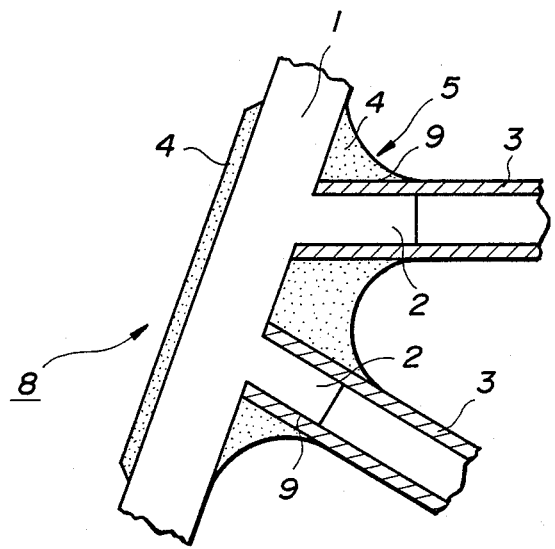
FIGS. 1 to 3 show a first embodiment of the present invention applied to a head lug.
Figure 2:
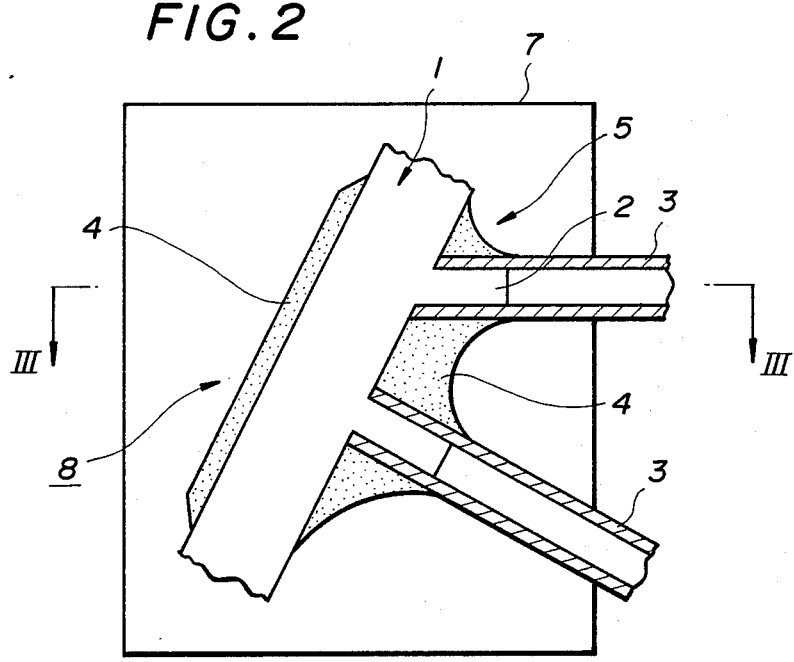
Figure 3:
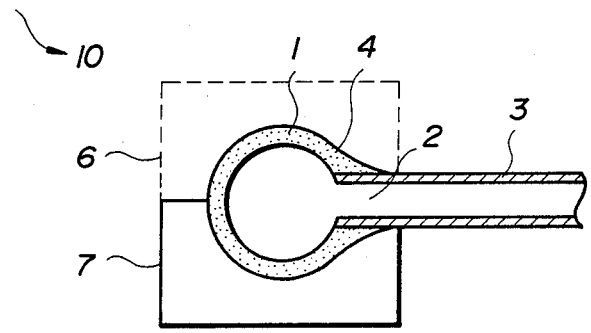

In FIGS. 1 to 3, head lug 1 is made from thin wall thickness light alloy and comprises cylindrical projecting parts 2. Pipe 3 is put around the projecting part 2 of a lug 1 and it is made by fiber reinforced plastic, using glass fibers, carbon fibers or aramide fibers.

Covering body 4 is made from SMC. The SMC consists of the required quantity of plastic and chopped fibers, i.e. the same as the fibers comprising the fiber reinforced plastic forming the pipe.

The lug 1 and pipe 3 are joined together by the covering body 4 covering the outer circumference of a joining part of the projecting part 2 of the lug 1 and pipe 3.

Top mold 6 and bottom mold 7 are shown in FIG. 2. Joining part 8 is a projecting part 2 of the lug 1 and pipe 3. Adhesive agents 9 are of the thermosetting plastic type spread between the pipe 3 and projecting part 2 of the lug 1. Reference number 10 is a mold.

Hereinafter, actual operation of the embodiment of FIGS. 1 to 3 will be mentioned.

The covering body 4 is shaped by compression molding in a mold 10.

Said mold 10 is a split mold consisted of a top mold 6 and bottom mold 7.

The joining part 8 of the projecting part 2 of the lug 1 and pipe 3 is made as follows.

First, the adhesive agent 9 consisting of thermosetting type plastic is spread around the projecting part 2 of the head lug 1, and then a pipe 3 made by fiber reinforced plastic is placed around the projecting part of the head lug 1.

Next, the SMC is spread around head lug 1 and pipes 3 to form covering body 4. The body 4, lug 1 and pipe 3 are then placed into compression mold 10. Mold 10 is kept in a state of compression and heating until body 4 sets to produce a finished bicycle frame joint.

Figure 4:
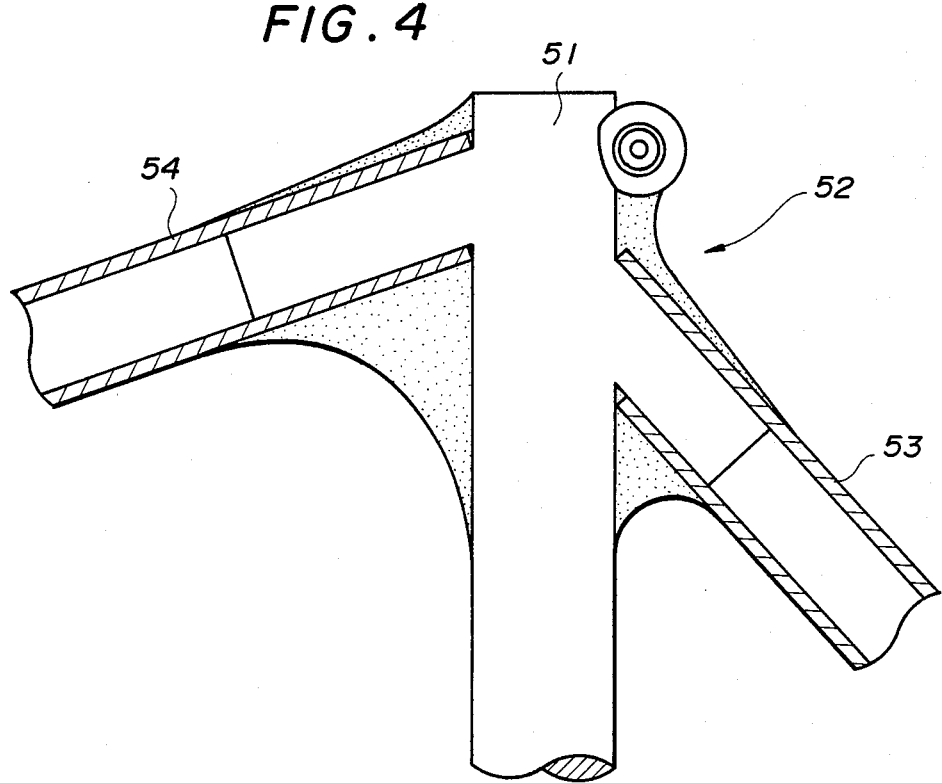
FIG. 4 shows a second embodiment of the present invention applied to a seat lug.

FIG. 4 shows the second embodiment of the present invention seating lug 51.

In FIG. 4, 52 is a joining part of a seat stay 53, top tube 54 and seat lug 51.

Figure 5:
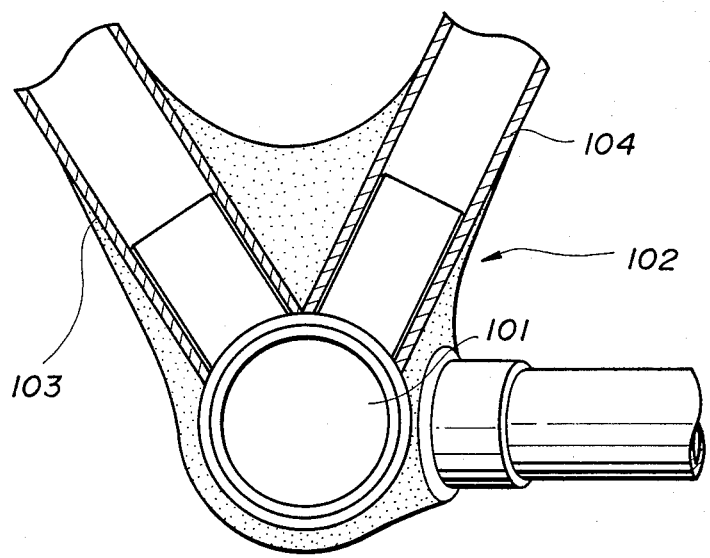
FIG. 5 shown a third embodiment of the present invention applied to a bottom bracket.

FIG. 5 shows the third embodiment of the present invention seating bottom bracket 101. In FIG. 5, 103 is a down tube, 104 is a seat tube and 102 is a joining part of the down tube 103, seat tube 104 and bottom bracket 101.

Figure 6:
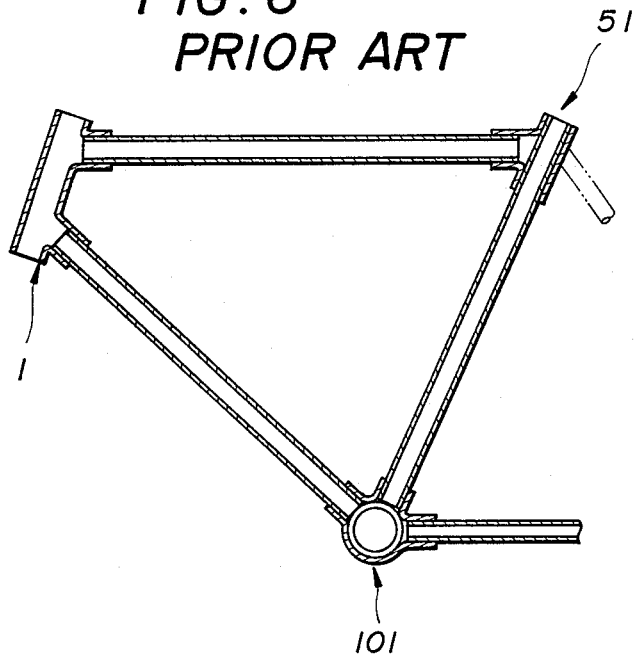
FIG. 6 and FIG. 7 show side views of prior art bicycle frames.
Figure 7:
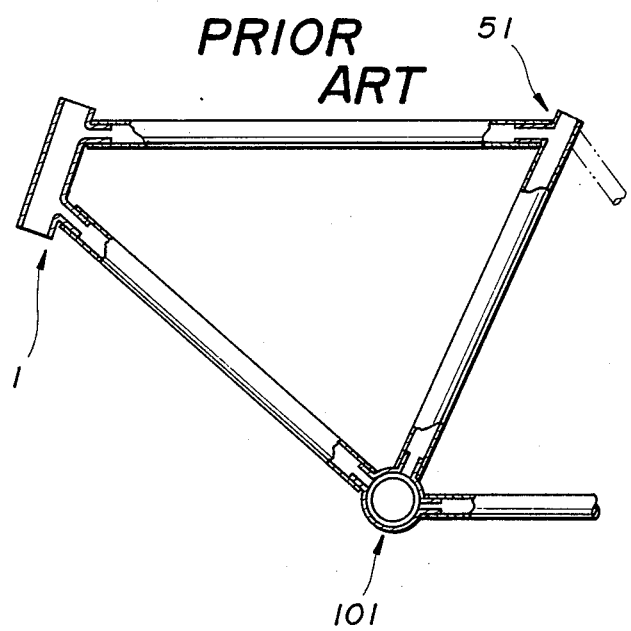

In FIGS. 6 and 7 there is shown head lug 1, seat lug 51 and bottom bracket 101. The cylindrical projecting part of the lugs and bottom bracket are joined to the metal pipe by thermal setting adhesive agents.

What is claimed:

1. A pipe joint construction for a bicycle frame comprising,
   a circular pipe formed from fiber reinforced plastic;
   a lug having a cylindrical projecting part made of thin wall light alloy, said alloy part in the form of a circular pipe having a diameter to enable overlapping of said alloy part and said fiber reinforced plastic pipe; said fiber reinforced plastic pipe overlapping and being bonded to said cylindrical part of the lug; and a joining part of chopped fiber reinforced plastic surrounding said cylindrical projecting part of the lug and the fiber reinforced plastic pipe surrounding the projecting part, said fiber in the reinforced plastic pipe and joining part being of the same material bonded into one body.

2. The pipe joint construction according to claim 1 wherein said joining part chopped fiber reinforced plastic contains fibers of from 10–100 mm in length.

* * * * *